United States Patent [19]

Behrens et al.

[11] Patent Number: 4,532,526

[45] Date of Patent: Jul. 30, 1985

[54] OPTICAL PRINTING HEAD FOR LINE-BY-LINE RECORDING OF PICTURE AND TEXT INFORMATION

[75] Inventors: Herbert Behrens, Zetel; Rainer Marx, Wilhelmshaven; Jürgen Schmitt, Stadland, all of Fed. Rep. of Germany

[73] Assignee: Olympia Werke AG, Wilhelmshaven, Fed. Rep. of Germany

[21] Appl. No.: 486,937

[22] Filed: Apr. 20, 1983

[30] Foreign Application Priority Data

Apr. 20, 1982 [DE] Fed. Rep. of Germany ....... 3212519

[51] Int. Cl.[3] .............................................. G01D 9/42

[52] U.S. Cl. .................................... 346/107 R; 354/4; 350/247

[58] Field of Search ................... 346/108, 107 R, 160; 354/4; 350/247

[56] References Cited

U.S. PATENT DOCUMENTS

| | | | |
|---|---|---|---|
| 3,713,725 | 1/1973 | Uesugi | 350/247 |
| 3,952,311 | 4/1976 | Lapeyre | 346/107 R |
| 3,989,358 | 11/1976 | Melmoth | 350/247 |
| 4,003,059 | 1/1977 | Sugiura | 346/108 |
| 4,278,981 | 7/1981 | Hill | 346/108 |

FOREIGN PATENT DOCUMENTS

| | | |
|---|---|---|
| 2557254 | 6/1977 | Fed. Rep. of Germany . |
| 2606596 | 8/1977 | Fed. Rep. of Germany . |
| 2812206 | 10/1979 | Fed. Rep. of Germany . |

*Primary Examiner*—Thomas H. Tarcza
*Assistant Examiner*—M. J. Reinhart
*Attorney, Agent, or Firm*—Spencer & Frank

[57] ABSTRACT

An optical printing head for a printer for the line-by-line recording of graphics and text in successive parallel lines on a photosensitive record carrier disposed at a printing location, the head including: a plurality of actuatable optical components disposed adjacent one another in the direction of the recording lines and each constituting a source of dot-like light elements; objective lenses disposed between, and having optical axes extending between, the optical components and the printing location for projecting the light elements provided by each optical component onto the printing location along a portion of each printing line; and members operatively associated with the lenses for adjustably positioning the lenses relative to the optical components in at least one direction in a plane transverse to the optical axes.

17 Claims, 10 Drawing Figures

OPTICAL PRINTING HEAD FOR LINE-BY-LINE RECORDING OF PICTURE AND TEXT INFORMATION

BACKGROUND OF THE INVENTION

The present invention relates to a printer having an optical printing head for line-by-line recording of picture and text informations and a plurality of juxtaposed, actuatable optical components having picture dot elements which transmit light in dots along the length of a recorded line through objective lenses onto a photosensitive record carrier.

Data processing systems require fast printers so as to convert the electrical input signals into visible displays that can be easily read in a print-out. For this purpose, printers having optical printing heads have been used with success. For example, an optical printing device including a photosensitive record carrier, photopaper or intermediate record carrier and an electrically controllable optical component having picture dot elements to block the flow of light or permit it to pass is disclosed in German Offenlegungsschrift [Laid-open Application] No. 2,557,254.

An optical printer having a magnetically controllable optical component is disclosed in German Offenlegungsschrift No. 2,812,206. It is based on an integrated light modulation matrix which requires neither the deflection of a light beam nor electrostatic charges for the actual printing process. Such an integrated light modulation matrix is disclosed in German Offenlegungsschrift No. 2,606,596.

The operation of that matrix is based on light modulation by means of magneto-optical storage layers, such as, for example, iron garnet layers. Such layers include a uniform arrangement of light switching elements which are switched purely electronically by means of vapor-deposited layers of conductor paths and resistors. With high integration density it is possible to construct line-by-line switching, light switching components having more than one thousand elements. These light switching elements are disposed between a constant light source and a photosensitive record carrier and can be controlled by a character generator in such a manner that the light constantly radiated by the light source can be blocked or passed as required at the locations of predetermined character raster dots.

In order to be able to form a single straight print line on the photosensitive surface, a plurality of light switching elements are required which are arranged in a row transversely to the direction in which the record carrier is transported. Below the light switching elements, between these elements and the record carrier, an optical system is provided for adaptation to the printing surface of the record carrier.

To obtain a precisely aligned printed line without visible transitions between the individual switching elements, adjustment transversely to the optical axis must be possible. For this purpose, one known arrangement adjusts each component composed of one light switching element and one objective lens. Since such a component is relatively large and the displacement must be no more than a few tenths of a millimeter, such adjustment is very time-consuming and costly.

SUMMARY OF THE INVENTION

It is an object of the present invention to provide a printer having an optical printing head wherein setting of the position relationships between the individual components of the optical printing head is assured in such a manner that a precisely straight printed line without visible transitions is produced on the photosensitive record carrier.

The above and other objects are achieved, according to the present invention, by a novel optical printing head for a printer for the line-by-line recording of graphics and text in successive parallel lines on a photosensitive record carrier disposed at a printing location, which head comprises: a plurality of actuatable optical components disposed adjacent one another in the direction of the recording lines and each constituting means for providing dot-like light elements; objective lenses disposed between, and having optical axes extending between, the optical components and the printing location for projecting the light elements provided by each optical component onto the printing location along a portion of each printing line; and means operatively associated with the lenses for adjustably positioning the lenses relative to the optical components in at least one direction in a plane transverse to the optical axes.

The printer according to the invention permits fast and simple adjustment of the objective lenses and/or of the light switching elements. The adjustment can here be effected with conventional tools directly at the printer.

Preferably, the head further includes a housing in which the optical components are fixed, and the positioning means are operative for moving the lenses in two mutually perpendicular directions transverse to the optical axes. This permits adjustment at an easily accessible location in the optical printing head. —

In conjunction with the latter type of positioning means, the head advantageously further includes a traverse rod carried by the housing and having a planar contact face, each lens has a lower frontal face via which the lens rests on the planar contact face of the rod, and the positioning means comprise wedge-shaped spacer members disposed between the lenses and movable for displacing the lenses relative to one another in the direction of the printing lines, and adjusting screws disposed at diametrically opposed points of each lens and adjustable for positioning the lenses in a direction transverse to the printing lines.

This permits stepless setting of the objective lenses in the longitudinal direction of the printing line.

Advantageously, the head further includes a wall and a spring carried by the housing, and the objective lenses are disposed in a line between the wall and the spring and are urged toward the wall by the spring. The lenses may then be positioned in sequence so that the lens which is adjacent the wall is positioned first and the lens which is adjacent the spring is positioned last. This permits adjustment of all objective lenses in the shortest possible time. The optical components may comprise light switching elements or controllable light sources which are of simple design and do not require high control voltages.

The present invention will now be explained in greater detail with reference to illustrated embodiments.

BRIEF DESCRIPTION OF THE DRAWING

FIG. 4 is a plan view showing the adjusting device for the objective lenses in the printer of FIG. 1.

FIGS. 7, 7*a*, 7*b* and 7*c* are pictorial views showing errors produced on a record carrier due to offset arrangements of the light switching elements.

FIG. 8 is a cross-sectional detail of one eccentric bolt.

DESCRIPTION OF THE PREFERRED EMBODIMENTS

Figure 1:
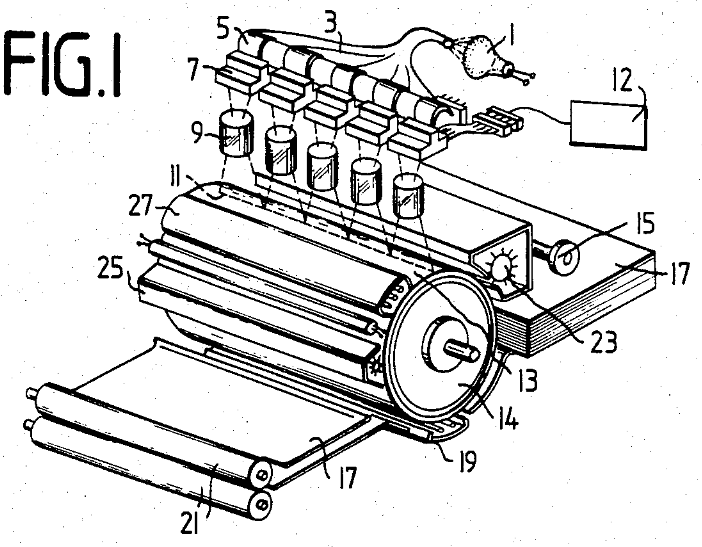
FIG. 1 is a perspective view showing the essential components of an embodiment of a printer according to the invention.
Figure 2:
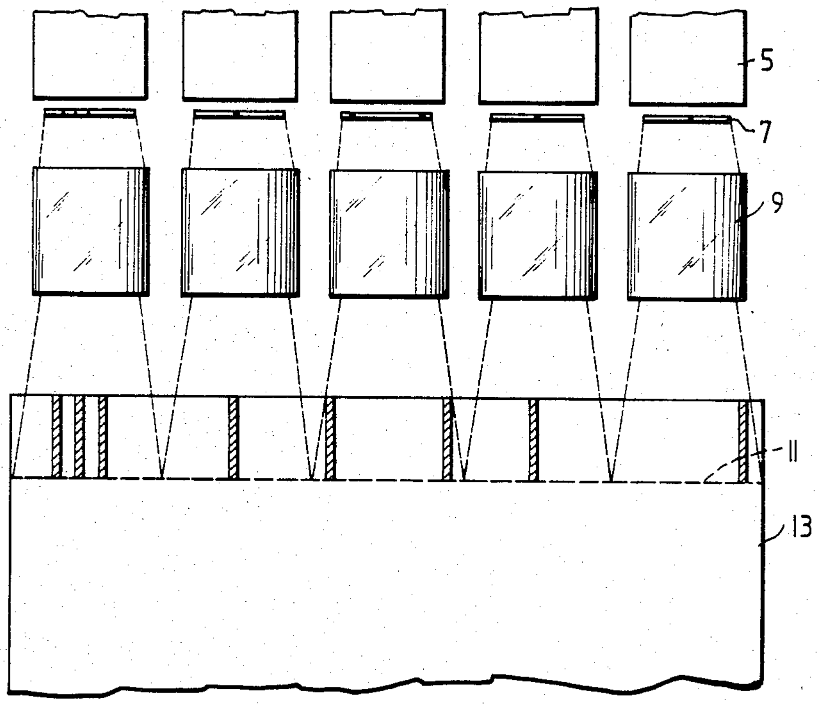
FIG. 2 is a side elevational detail view of a portion of the printer of FIG. 1.

FIG. 1 shows a printer including a light source 1, i.e. a halogen lamp, from which light is conducted through light conductive fibers 3 and, as also shown in FIG. 2, cross-section converters 5 to known light switching elements 7 comprising picture, or character, dot elements. Objective lenses 9 focus, or reproduce, the light dots from these switching elements 7 along the length of a recording line 11 on a photosensitive record carrier 13 being transported around a drum 14.

The light switching elements 7, which serve as actuatable optical components, are actuated in a known manner by a character generator 12 in such a manner that the light constantly emitted by the light source 1 can be blocked or passed as required at each character dot element, corresponding to a predetermined character raster point.

Thus, the optical printing head of the printer includes the light source 1, the light conductive fibers 3, the cross section converters 5, the light switching elements 7 and the objective lenses 9. This printing head permits line-by-line recording, on the photosensitive record carrier 13, of graphics and text which are then electrographically developed and fixed in a known manner. For this purpose, there is provided a developing device 23, a paper intake roller 15 to pull in a sheet of recording medium 17, a transfer station 19 and a fixing device 21 provided with pressure rollers. Additionally, a cleaning device 25 and a charging corona 27 are provided around drum 14. The impingement of the optical axes perpendicular to the record carrier 13 is structurally controllable. The minimal error produced thereby is no longer visible in the text portions. All light switching elements 7 are pressed against a guide strip 39, shown in FIG. 3, which is arranged in such a manner that the optical axes are perpendicular to the record carrier 13. The remaining minimal error will be eliminated by adjusting the light switching elements 7 and the lenses 9.

In FIG. 1, five light switching elements 7 are shown, and each has 512 switchable dot elements for one whole line so that a complete line is associated with 5×512 picture elements.

Figures 4, 7A, 7B, 7C, 8:
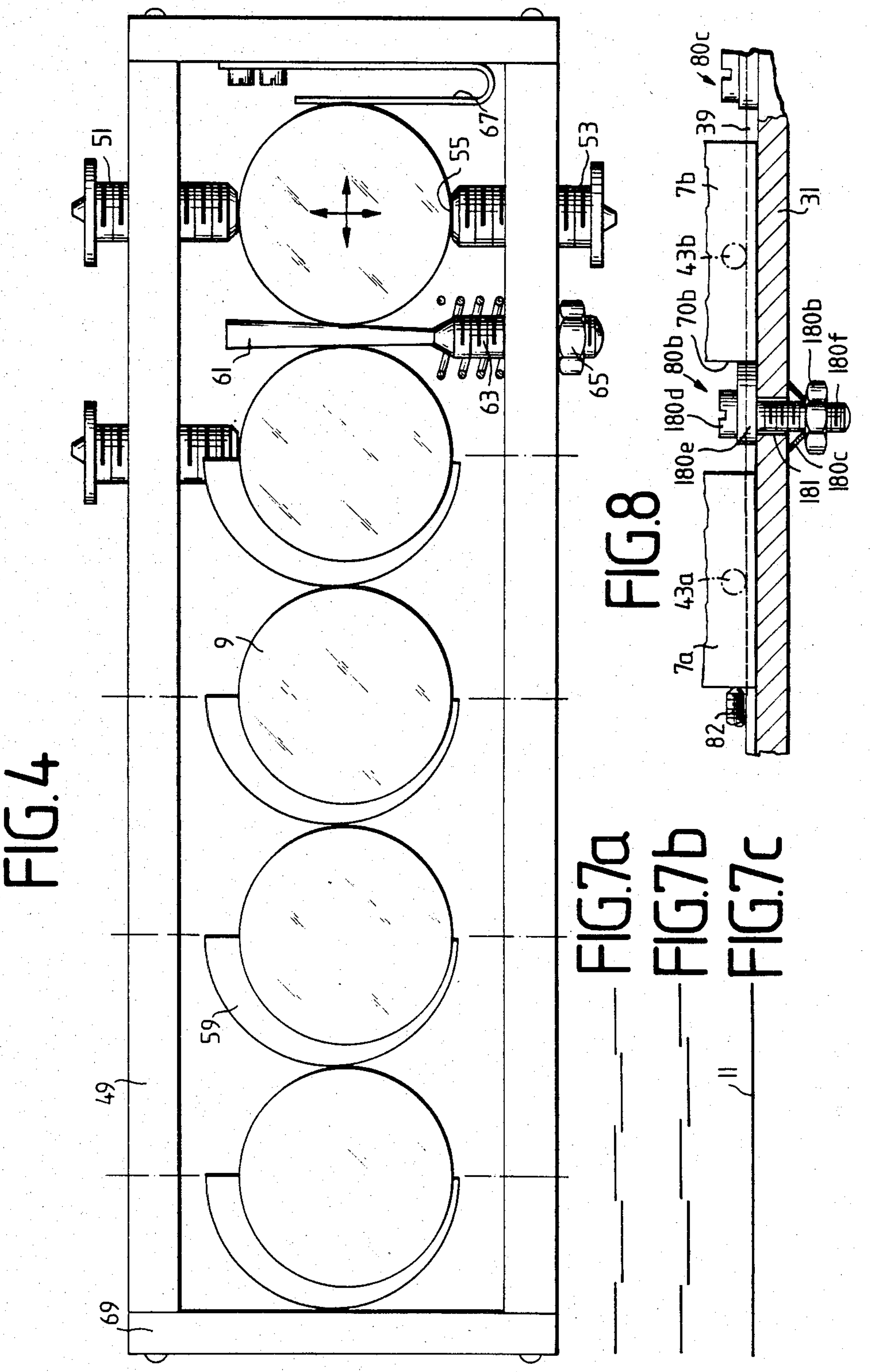

FIG. 7 show offset errors appearing in one recorded line on a record carrier, as they may be produced by cooperation of the light switching elements 7 and the objective lenses 9 in the optical printing head 10. In FIG. 7*a*, the printed line parts are arranged to be offset in the line direction while in FIG. 7*b* the printed line parts are shown to be properly positioned in the longitudinal direction. Finally, FIG. 7*c* shows the ideal printed line which is aligned in the line direction as well as transverse thereto.

Figure 3:
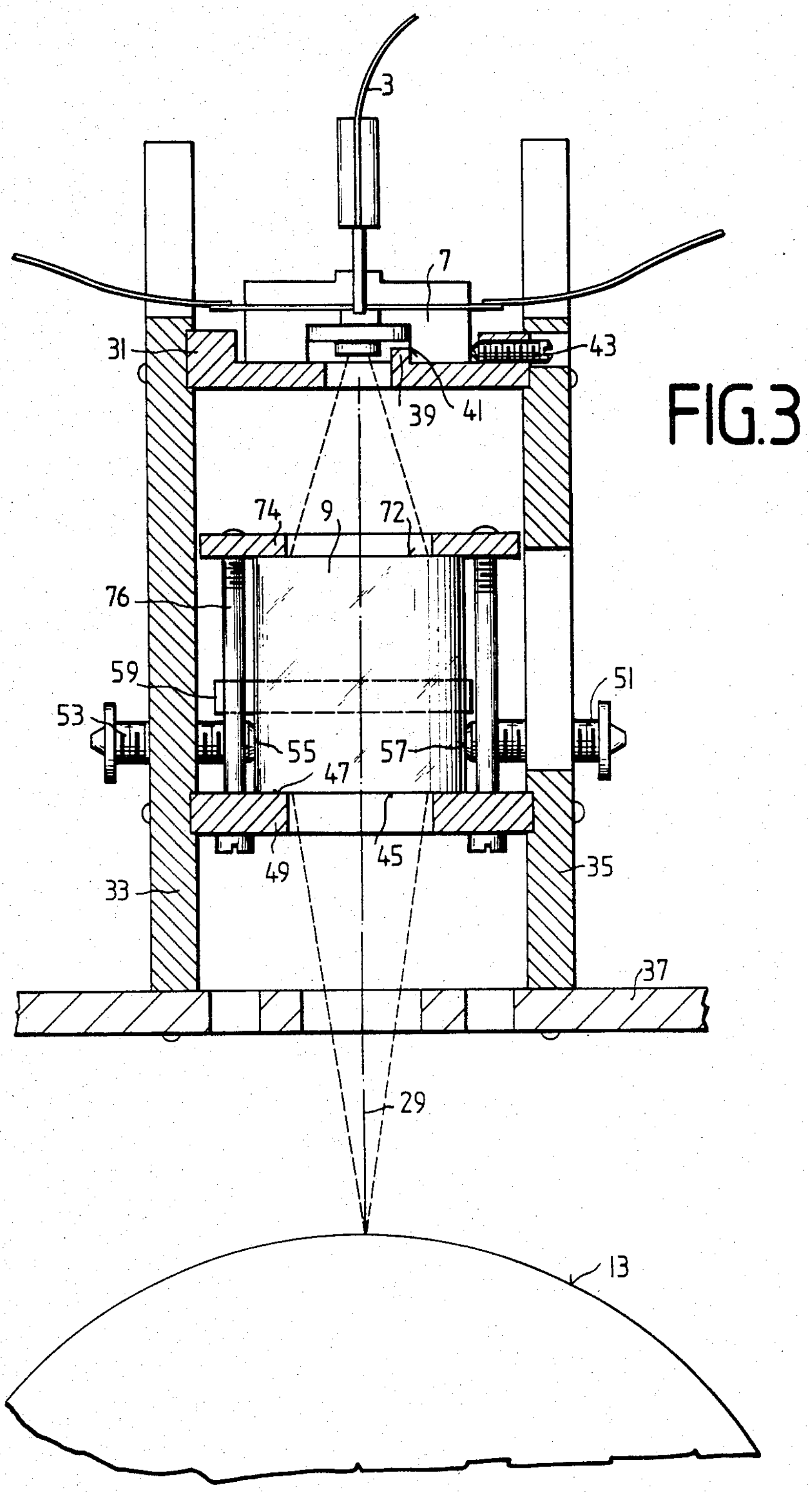
FIG. 3 is a cross-sectional detail view of one unit of the printer of FIG. 1.

In order to obtain a closed printed line on the record carrier 13, each actuable optical component and the corresponding associated objective lens 9 are arranged to be adjustable relative to one another in a plane extending transversely to the longitudinal direction of the optical axes. For this purpose, the light switching elements 7 are mounted, as shown in FIG. 3, on a carrier 31 which is fixed to the side walls 33 and 35 of a housing 37. The carrier 31 has a guide strip 39 extending in the line direction against which abutment edges 41 of the light switching elements 7 can be pressed and fixed by means of set screws 43. The lower frontal faces 45 of the objective lenses 9 are mounted on the planar contact face 47 of a traverse rod 49 in the printing head. The carrier 31 and rod 49 are arranged parallel to one another.

The objective lenses 9 are displaced on the contact face 47 by means of adjustment screws 51 and 53 arranged at diametrally opposite sides of the axis of the objective lenses 9. At their ends facing the objective lenses, these adjusting screws 51 and 53 are provided with respective flat abutment edges 55 and 57. Screws 51 and 53 are provided for adjusting the objective lenses 9 perpendicular to the printing line direction. In addition, as shown in FIG. 4, wedge-shaped spacer members 59 in the form of eccentric half rings are fastened to the objective lenses 9 for adjusting lenses 9 in the line direction. When one objective lens 9 is rotated, it is also displaced in the line direction and its position is thus adjusted.

Each wedge-shaped spacer member may also be composed, as also shown in FIG. 4, of spring tensioned intermediate wedges 61 each fixed to a threaded pin 63. Pin 63 is threaded into a nut 65 which can be turned to displace the intermediate wedge 61. Pin 63 is prevented from rotating because it is fixed to wedge 61 and the latter is clamped between two lenses 9.

The row of objective lenses 9 can be pressed against a housing wall 69 in the printing head by means of a spring 67 acting on the objective lens 9 furthest from wall 69. Positioning of the objective lenses in the line direction is advisably effected in that, during alignment, the objective lens 9 resting against housing wall 69 is adjusted first and the objective lens 9 bearing against spring 67 is adjusted last. The positioning of the objective lenses 9 in the line direction is effected with the adjusting screws 51, 53 loosened slightly.

After adjustment of the objective lenses by means of adjusting screws 51, 53 perpendicular to the line direction and perpendicular to the optical axis 29 and by means of the spacer members 59 or 61 in the line direction, the upper frontal faces 72 of the objective lenses 9 are brought into contact with a cover plate 74 which is then used to fix the objective lenses 9 in the selected positions on the traverse rod 49 by means of clamping screws 76. This prevents any displacement of the objective lenses during transport or change of location of the printer.

Figure 6:
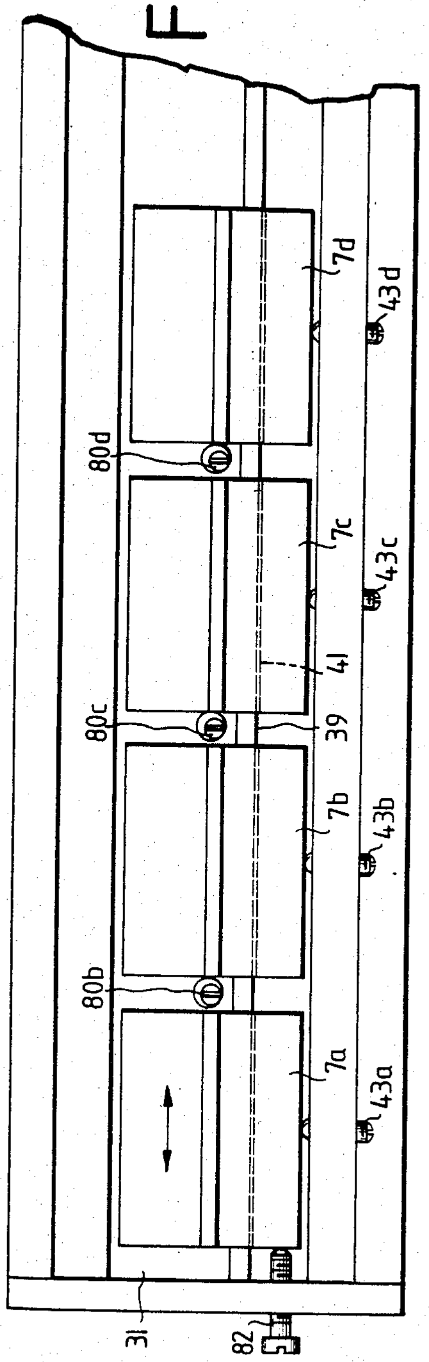
FIG. 6 is a plan detail view showing the device for adjusting the light switching elements in the longitudinal direction, i.e. the line direction, in cooperation with the structure of FIG. 5.
Figure 5:
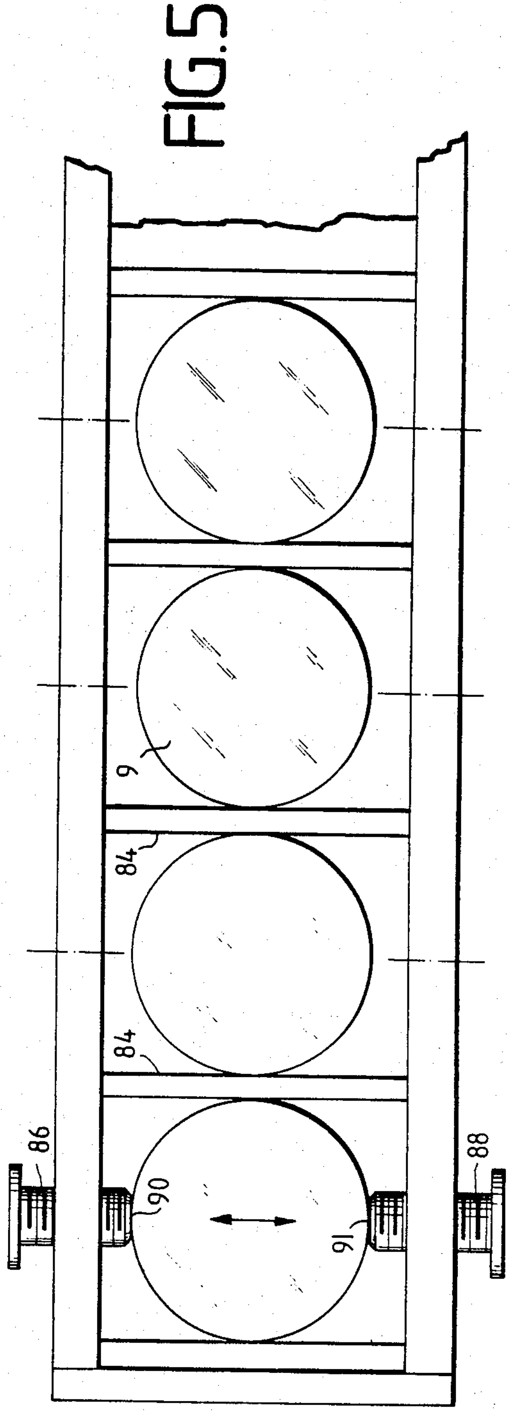
FIG. 5 is a plan view showing the adjustment of the objective lenses perpendicular to the line direction according to a second embodiment of the invention.

FIGS. 5 and 6 show a second embodiment for adjusting the light switching elements 7 and the objective lenses 9 relative to one another. Here, the abutment edges 41 of light switching element 7 are pressed by means of screws 43 against the guide strip 39 and the light switching element 7 are displaced in the line direction by means of respective eccentric bolts 80 each related to one element 7. By displacing the light switching elements 7, errors in the line direction are eliminated. For this adjustment, the clamping screws 43 are loosened slightly. Clamping screws 43 may be tipped screw nails, thus realizing a positive fixation. Here again, the setting of the light switching elements begins at one end and continues through to the other. Moreover, the left-hand light switching element 7 may also be positioned by means of a setting screw 82 as shown in FIG. 6.

The printed line portion associated with each element 7 is aligned transversely to the line direction of o printed line by displacing each objective lens along guide grooves 84 provided in the printing head in a direction transverse to the line direction. The objective lenses 9 are here guided in the grooves 84 without play and are displaced only transverse to the line direction by means of setting screws 86 and 88. Setting screws 86, 88 are again arranged diametrally to the axis of the objective lenses and are likewise provided with flattened portions 90 and 91. By displacing the light switching elements 7 in one adjustment direction and displacing the objective lenses 9 in the other adjustment direction, adjustment for producing a continuous printed line on record carrier 13 is realized in the simplest manner possible.

The actuatable optical components shown in the drawing figures may also be constituted by actuatable light sources. Such light sources may be, for example, light-emitting diodes (LED's). Moreover, the light switching element 7 and the light sources can be actuated by means of a microcomputer arrangement or by means of a microprocessor. To be able to change the distance of the objective lenses from record carrier 13, the objective lenses 9 may be arranged in a known manner to be axially displaceable in a tube or cylinder.

The FIG. 8 illustrated details of the form and manner of mounting of the exxentric bolts 80. The setting of the light switching element *7a, 7b, 7c, 7d* etc begins at the left end. The left-hand switching element *7a* will be positioned by the setting screw 82 in line direction. After this positioning the light switching element *7a* will be fixed by the clamping screw 43*a*. The light switching element *7a* will be pressed against the guide strip 39. Then the light switching element *7b* will be positioned by the eccenter bolt 80*b*. This eccenter bolt 80*b* has an threaded bolt 180*f*, an eccentric 180*e* and a head 180*d* and will be fixed on the carrier 31 by a spring 180*c* and a fixing nut 180*b*. The eccentric 180*e* stands always in contact with the abutment edges 70*b* of the light switching element *7b*. After positioning the light switching element *7b* by the eccenter bolt 80*b*, it will be fixed by the setting screws 43*b*. The other light switching elements will be positioned and fixed by the exxenter bolt 80*c* and 80*d* and the setting screws 43*c* and 43*b*.

The light-emitting diodes are well known in the prior art and are described in the U.S. Pat. Appl. Ser. No. 162,968, June 25, 1980.

In order to obtain a closed printing line on the record carrier 13, each actuatable component and the corresponding associated objective lens are arranged to be adjustable relative to one another. For this purpose the light switching elements 7 are displaced in one direction and the objective lenses 9 are adjusting in the other direction. The range of adjustment movement for the lenses 9 and the light switching elements 7 is equal.

The vertical hatched lines represent pattern which are producing on the record carrier 13 by the developing device 23.

It will be understood that the above description of the present invention is susceptible to various modifications, changes and adaptations, and the same are intended to be comprehended within the meaning and range of equivalents of the appended claims.

What is claimed is:

1. An optical printing head for a printer for the line-by-line recording of graphics and text in successive parallel lines on a photosensitive record carrier disposed at a printing location, said head comprising: a plurality of actuatable optical components disposed adjacent one another in the direction of the recording lines and each constituting means for providing dot-like light elements; a plurality of objective lenses each disposed between, and having an optical axis extending between, a respective optical component and the printing location for projecting the light elements provided by said respective optical component onto the printing location along a respective portion of each printing line; and means operatively associated with each said lens for adjustably positioning each said lens individually relative to its associated optical component in at least one direction in a plane transverse to the optical axes of said lenses for precisely aligning the projected light elements provided by said optical components along each printing line.

2. An arrangement as defined in claim 1 further comprising a housing in which said optical components are fixed, and said positioning means are operative for moving said lenses in two mutually perpendicular directions transverse to the optical axes.

3. An arrangement as defined in claim 2 further comprising a traverse rod carried by said housing and having a planar contact face, each said lens has a lower frontal face via which said lens rests on said planar contact face of said rod, and said positioning means comprise wedge-shaped spacer members disposed between said lenses and movable for displacing said lenses relative to one another in the direction of the printing lines, and adjusting screws disposed at diametrically opposed points of each said lens and adjustable for positioning said lenses in a direction transverse to the printing lines.

4. An arrangement as defined in claim 3 wherein said wedge-shaped spacer members have the form of eccentric half rings fastened to said objective lenses.

5. An arrangement as defined in claim 3 wherein each said wedge-shaped spacer member has the form of a spring tensioned intermediate wedge, a threaded pin fixed to said wedge, and a nut threadedly engaging said pin for displacing said wedge.

6. An arrangement as defined in claim 3 further comprising a wall and a spring carried by said housing, and wherein said objective lenses are disposed in a line between said wall and said spring and are urged toward said wall by said spring.

7. A method of positioning said objective lenses of said printing head as defined in claim 6 comprising positioning said lenses in sequence so that that one of said lenses which is adjacent said wall is positioned first and that one of said lenses which is adjacent said spring is positioned last.

8. A method as defined in claim 7 further comprising positioning said lenses by means of said adjusting screws and, after positioning said lenses in the direction of the printing lines and the direction transverse to the printing lines, placing a cover plate upon said lenses and clamping said lenses against said traverse rod by means of the cover plate.

9. An arrangement as defined in claim 1 further comprising means operatively associated with said optical components for adjustably positioning said components in the direction of the printing lines in a plane transverse to the optical axes, and said means operatively associated with said objective lenses are arranged for adjustably positioning said lenses transversely to the direction of the printing lines.

10. An arrangement as defined in claim 9 further comprising a guide strip fixed relative to said head, and wherein said optical components are formed to be pressed transversely to the direction of the printing lines against said guide strip, and said means operatively associated with said optical components comprise a plurality of eccentric bolts each disposed between two adjacent optical components.

11. An arrangement as defined in claim 9 further comprising means defining guide grooves fixed relative to said head, extending transversely to the direction of the printing lines, and each guiding a respective lens for movement transverse to the printing lines without play in the direction of the printing lines, and wherein said means operatively associated with said lenses comprises pairs of set screws, with each pair being associated with a respective lens.

12. An arrangement as defined in claim 1 wherein each said actuatable optical component comprises light switching elements arranged to be electrically controlled by a character generator for selectively blocking or passing the light emitted constantly by a light source with respect to each dot-like light element.

13. An arrangement as defined in claim 12 wherein said light switching elements are arranged to be actuated by means of a device including a microprocessor.

14. An arrangement as defined in claim 1 wherein said actuatable optical components are controllable light sources.

15. An arrangement as defined in claim 14 wherein said light sources are light-emitting diodes.

16. An arrangement as defined in claim 14 wherein said light switching elements are arranged to be actuated by means of a device including a microprocessor.

17. An arrangement as defined in claim 1 wherein each said objective lens comprises a support tube and lens components axially displaceable in said tube.

* * * * *

UNITED STATES PATENT AND TRADEMARK OFFICE

CERTIFICATE OF CORRECTION

PATENT NO. : 4,532,526

DATED : July 30th, 1985

INVENTOR(S) : Herbert Behrens et al

It is certified that error appears in the above-identified patent and that said Letters Patent is hereby corrected as shown below:

In the heading of the patent, under [30] Foreign Application Priority Data, instead of "3212519" the identification number should be --3214519--.

Signed and Sealed this

*Eighth* Day of *October 1985*

[SEAL]

*Attest:*

DONALD J. QUIGG

*Attesting Officer*

*Commissioner of Patents and Trademarks—Designate*